United States Patent
Osotio et al.

(10) Patent No.: US 10,783,149 B2
(45) Date of Patent: Sep. 22, 2020

(54) DYNAMIC PRODUCTIVITY CONTENT RENDERING BASED UPON USER INTERACTION PATTERNS

(71) Applicant: Microsoft Technology Licensing, LLC, Redmond, WA (US)

(72) Inventors: Neal Timothy Osotio, Sammamish, WA (US); Li-Chen Lim Miller, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 403 days.

(21) Appl. No.: 15/667,105

(22) Filed: Aug. 2, 2017

(65) Prior Publication Data
US 2019/0042627 A1    Feb. 7, 2019

(51) Int. Cl.
*G06F 16/00*    (2019.01)
*G06F 16/2457*    (2019.01)
(Continued)

(52) U.S. Cl.
CPC .... *G06F 16/24575* (2019.01); *G06F 16/2448* (2019.01); *G06F 16/26* (2019.01); *G06Q 10/10* (2013.01)

(58) Field of Classification Search
CPC . G06F 16/24575; G06F 16/2448; G06F 16/26
(Continued)

(56) References Cited

U.S. PATENT DOCUMENTS 7,698,316 B2    4/2010    Song et al.
8,676,732 B2 *  3/2014    Sweeney ............ G06F 16/9535
                                              706/12
(Continued)

FOREIGN PATENT DOCUMENTS

WO    2006017495 A2    2/2006
WO    2017096099 A1    6/2017

OTHER PUBLICATIONS

Jones, Nicola, "New AI-Based Search Engines are a "Game Changer" for Science Research", In Publication of Nature Magazine, Nov. 12, 2016, 12 pages.
(Continued)

*Primary Examiner* — Hanh B Thai

(57) ABSTRACT

An efficient blend of home/personal and work/productivity related content based on a user's intent is provided, wherein the user's intent can be determined based on context information, learned user interaction patterns, and historical work and home characteristics and patterns. The system is individualized to the user and operative to generate a user experience that provides a blend of relevant home/personal and work/productivity related information to the user based on the user's current work and life characteristics. From determined user intent, various aspects provide personalized computing experiences tailored to the user and, in some examples, incorporation of the user's patterns into an efficient blend of personal and productivity workflows. In further examples, the blend of home/personal and work/productivity related content and workflows are selectively displayed to the user such that screen resources are efficiently and advantageously allocated based on a determined relevance to the user's current work and life characteristics.

20 Claims, 9 Drawing Sheets

(51) Int. Cl.
*G06F 16/26* (2019.01)
*G06F 16/242* (2019.01)
*G06Q 10/10* (2012.01)

(58) Field of Classification Search
USPC .......................................................... 707/769
See application file for complete search history.

(56) References Cited

U.S. PATENT DOCUMENTS

| | | | |
|---|---|---|---|
| 8,700,620 B1 | 4/2014 | Lieberman | |
| 8,711,181 B1* | 4/2014 | Nourse | G06F 3/14 345/660 |
| 9,633,083 B2 | 4/2017 | VanBlon et al. | |
| 9,742,871 B1* | 8/2017 | Gibson | H04L 67/327 |
| 10,163,133 B2* | 12/2018 | Srivastava | G06Q 30/0269 |
| 2005/0144162 A1* | 6/2005 | Liang | G06F 16/152 |
| 2007/0016563 A1 | 1/2007 | Omoigui | |
| 2007/0073756 A1* | 3/2007 | Manhas | G06Q 30/00 |
| 2008/0005071 A1* | 1/2008 | Flake | G06Q 30/0261 |
| 2010/0191859 A1* | 7/2010 | Raveendran | H04L 65/605 709/231 |
| 2011/0178969 A1* | 7/2011 | Falchuk | G06N 20/00 706/45 |
| 2011/0302102 A1* | 12/2011 | Yeleshwarapu | G06Q 10/10 705/347 |
| 2012/0072381 A1* | 3/2012 | Cao | G06Q 30/02 706/12 |
| 2012/0108172 A1* | 5/2012 | Bullen | G06Q 10/10 455/41.2 |
| 2012/0150874 A1* | 6/2012 | Sweeney | G06F 16/367 707/749 |
| 2012/0296909 A1* | 11/2012 | Cao | G06F 16/9535 707/737 |
| 2013/0132566 A1* | 5/2013 | Olsen | H04W 4/025 709/224 |
| 2013/0238612 A1* | 9/2013 | Tsongas | G06F 16/9535 707/723 |
| 2013/0275417 A1* | 10/2013 | Fernandes | G06Q 30/0251 707/723 |
| 2014/0080106 A1* | 3/2014 | Falchuk | G06Q 30/02 434/236 |
| 2014/0164342 A1 | 6/2014 | Liapis | |
| 2015/0310072 A1* | 10/2015 | Dietz | G06F 16/22 707/741 |
| 2015/0341454 A1* | 11/2015 | Sims | H04L 67/22 709/204 |
| 2016/0132608 A1* | 5/2016 | Rathod | H04W 4/21 707/722 |
| 2016/0170996 A1* | 6/2016 | Frank | G06F 16/24578 707/748 |
| 2016/0188843 A1 | 6/2016 | Staples et al. | |
| 2016/0196499 A1* | 7/2016 | Khan | G06N 5/048 706/52 |
| 2016/0224561 A1* | 8/2016 | Agarwal | G06Q 50/01 |
| 2016/0292283 A1* | 10/2016 | Vishwanath | G06F 16/9535 |
| 2016/0314498 A1* | 10/2016 | Srivastava | G06Q 30/0269 |
| 2016/0335264 A1* | 11/2016 | Behal | G06F 16/24575 |
| 2016/0371379 A1* | 12/2016 | Fang | G06F 16/951 |
| 2017/0085587 A1* | 3/2017 | Turgeman | G06F 3/03547 |
| 2017/0140041 A1 | 5/2017 | Dotan-cohen et al. | |
| 2017/0140285 A1 | 5/2017 | Dotan-cohen et al. | |
| 2017/0147579 A1* | 5/2017 | Foerster | G06F 16/9535 |
| 2017/0147796 A1 | 5/2017 | Sardesai et al. | |
| 2017/0199912 A1* | 7/2017 | Su | G06F 16/26 |
| 2017/0228437 A1* | 8/2017 | Vora | G06F 16/24575 |
| 2018/0096440 A1* | 4/2018 | Lopez | G06Q 50/12 |
| 2018/0173403 A1* | 6/2018 | Carbune | G06Q 50/12 |
| 2018/0189356 A1* | 7/2018 | Ghafourifar | G06F 16/9024 |
| 2018/0196845 A1* | 7/2018 | Davies | G06F 16/2425 |
| 2018/0295209 A1* | 10/2018 | Dipin | H04L 67/327 |
| 2018/0349386 A1* | 12/2018 | Circlaeys | G06F 16/48 |

OTHER PUBLICATIONS

Metz, Cade, AI is Transforming Google Search. The Rest of the Web is Next, https://www.wired.com/2016/02/ai-is-changing-the-technology-behind-google-searches/, Feb. 4, 2016, 11 Pages.

"International Search Report and Written Opinion Issued in PCT Application No. PCT/US2018/038650", dated Sep. 6, 2018, 10 Pages.

* cited by examiner

DYNAMIC PRODUCTIVITY CONTENT RENDERING BASED UPON USER INTERACTION PATTERNS

BACKGROUND

Due in part to an ability to keep up with work related tasks through the evolution of technology, people's personal lives are more and more blended with work activities. Likewise, due in part to the prevalence of mobile computing devices, people's professional or work lives are more and more blended with personal or home activities. In some cases, work may encroach into a person's personal life more than might be wanted. Accordingly, the balance between work life and home life may be unbalanced/unhealthy for the user's personal and/or family life dynamic. While efforts have been made to increase user satisfaction through personalization of device and/or service operation, efforts have not been made to deliver a user experience that maximizes the work-life balance of a person's life.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and computer readable storage device for determining an efficient blend of home/personal and work/productivity related content based on a user's intent. For example, the user's intent can be determined based on context information, learned user interaction patterns, and historical work and home characteristics and patterns. The system is individualized to the user, and is further operative or configured to generate a user experience that provides a blend of relevant home/personal and work/productivity related information to the user based on the user's current work and life characteristics. According to examples, the user interaction patterns and historic work and home characteristics and patterns can be used to infer user intent. From an inferred user intent, various aspects provide personalized computing experiences tailored to the user and, in some examples, incorporation of the user's patterns into an efficient blend of personal and productivity workflows. In further examples, the blend of home/personal and work/productivity related content and workflows are selectively displayed to the user such that screen resources are efficiently and advantageously allocated based on a determined relevance to the user's current work and life characteristics.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
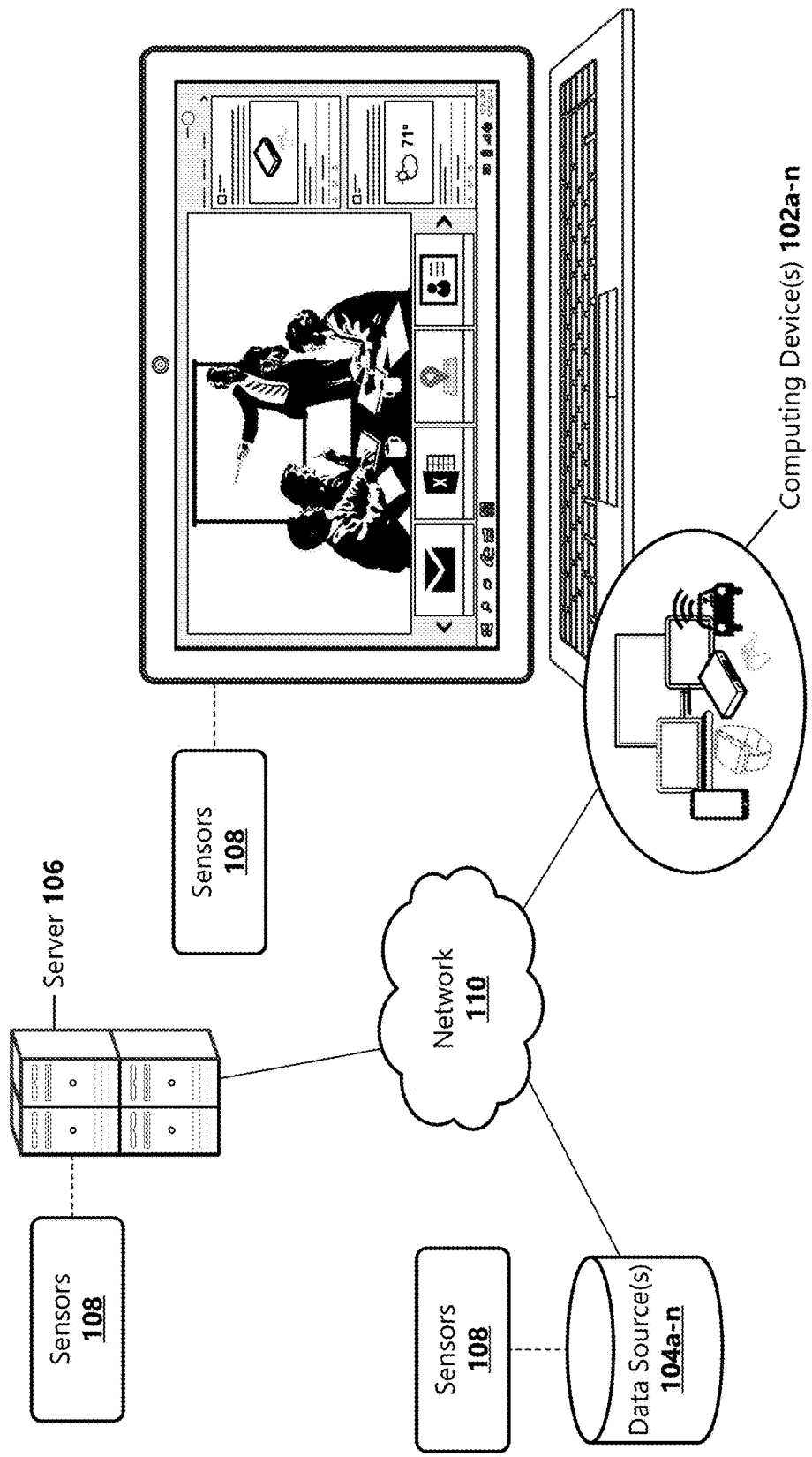
FIG. 1 is a block diagram showing an example operating environment for implementation of the present disclosure.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer readable storage device for generating a user experience that provides a blended workflow of relevant information to the user based on the user's current work and life characteristics. Aspects of the present disclosure relate to inferring a current mode or context associated with a user based on user interactions with one or more computing devices, and providing a relevant blend of content to the user based on the inferred context. In various examples, data corresponding to user activity and other context information can be gathered over time using sensors on one or more user devices associated with the user. From this historical user activity information, a computer system learns user interaction patterns associated with home/personal contexts and work/productivity contexts. Based on determined patterns of user interactions, predictions of user priorities can be determined and used to provide improved user experiences. Examples of these improved user experiences, which are further described below, include personalization services, such as tailoring content for the user and arranging the content in an improved display which results in more efficient user interaction and improved user efficiency.

Advantageously, the disclosed aspects enable the benefit of technical effects that include, but are not limited to, increased computational efficiency and reductions in bandwidth while providing an improved user experience by providing a blended workflow of relevant information to the user. For example, using aspects of the present disclosure, a personal digital assistant, a web search engine, or other application is enabled to retrieve information or services that better satisfy individual users' interests, preferences, and needs, thus reducing additional processing and bandwidth usage associated with avoidable searches for information that may not satisfy users. Users are thereby provided tools that produce an efficient blend of personal and work/productivity related information and that deliver an experience to users that maximizes the work-life balance of a person's life.

With reference now to FIG. 1, a block diagram is provided showing an example operating environment 100 in which aspects of the present disclosure can be employed. It should be understood that this and other arrangements described herein are provided as examples. Other arrangements and elements can be used in addition to or instead of those shown in FIG. 1. Various functions described herein as being performed by one or more elements or components can be carried out by hardware, firmware, and/or software. For example, some functions can be carried out by a processor executing instructions stored in memory. As illustrated, the example operating environment 100 includes one or more client computing devices 102a-n (generally 102), a number of data sources 104a-n (generally 104), at least one server 106, sensors 108, and network 110. Each of the components illustrated in FIG. 1 can be implemented via any type of computing device, such as the computing devices described in reference to FIGS. 5, 6A, 6B, and 7. As an example, the one or more client computing devices 102 can be one of various types of computing devices, such as tablet computing devices, desktop computers, mobile communication devices, laptop computers, laptop/tablet hybrid computing devices, large screen multi-touch displays, vehicle computing systems, gaming devices, smart televisions, wearable devices, internet of things (IoT) devices, etc.

The components can communicate with each other via network 110, which can include, without limitation, one or more local area networks (LANs) or wide area networks (WANs). In some examples, network 110 comprises the Internet and/or a cellular network, amongst any of a variety of possible public or private networks. As should be appreciated, any number of client computing devices 102, data sources 104, and servers 106 can be employed within the example operating environment 100 within the scope of the present disclosure. Each can comprise a single device or a plurality of devices cooperating in a distributed environment. For example, the server 106 can be provided via multiple devices arranged in a distributed environment that collectively provide various functionalities described herein. In some examples, other components not shown can be included within the distributed operating environment 100.

According to an aspect, the one or more data sources 104 can comprise data sources or data systems that are configured to make data available to any of the various components of operating environment 100 or of the example system 200 described below with reference to FIG. 2. In some examples, the one or more data sources 104 are discrete from the one or more client computing devices 102 and the at least one server 106. In other examples, the one or more data sources 104 are incorporated or integrated into at least one of the client computing devices 102 or servers 106.

Figure 2:
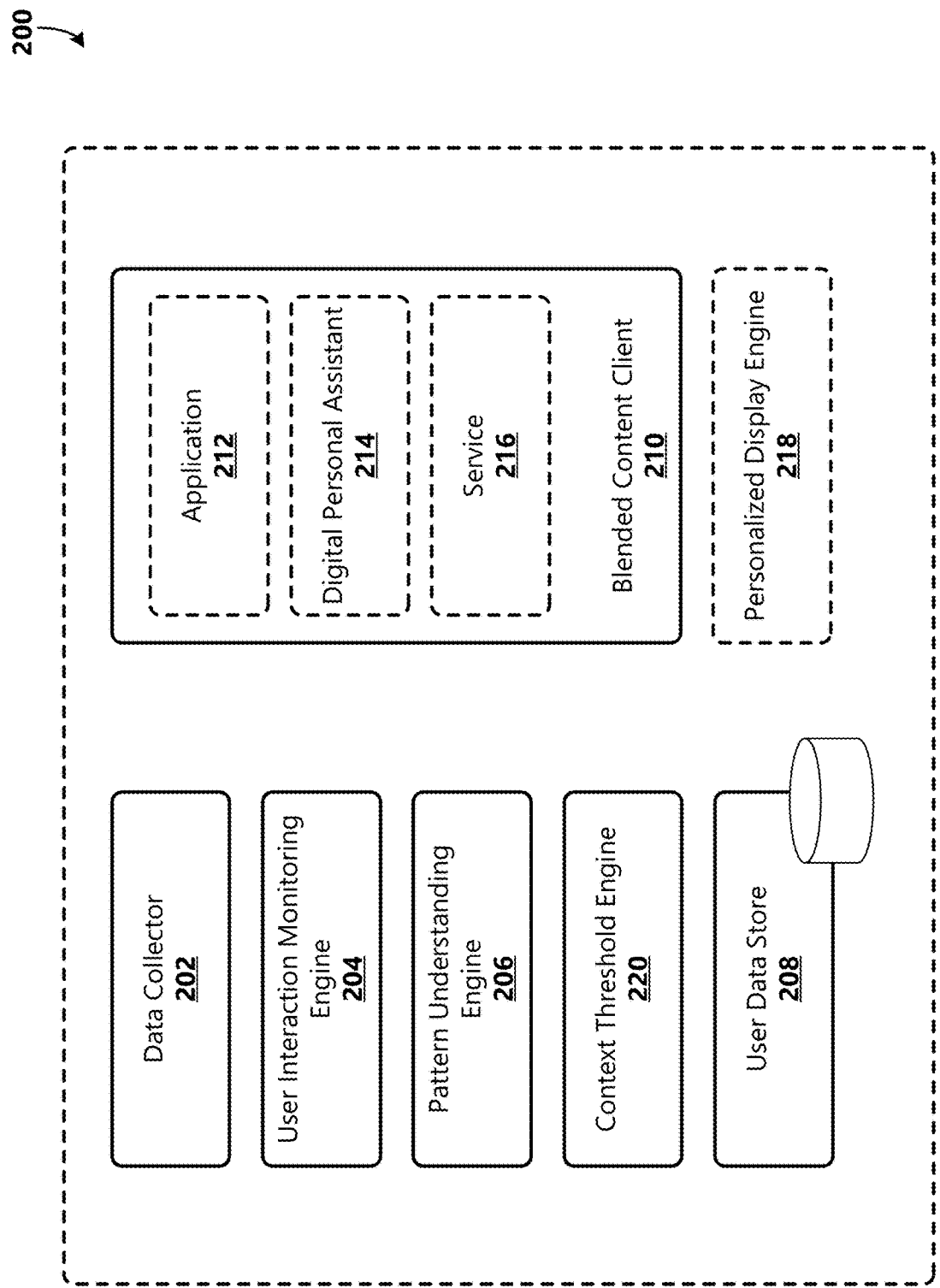
FIG. 2 is a block diagram showing an example computing architecture for implementing aspects of the present disclosure.

The example operating environment 100 can be used to implement one or more of the components of the example system 200 described in FIG. 2 including components for collecting user data, monitoring interaction events and characteristics, understanding user interaction patterns, work/productivity patterns, and home/personal patterns, consuming user interaction pattern information for determining an efficient blend of home/personal information and work/productivity information based on a determined threshold according to a user's current work and life characteristics to provide an improved user experience, and to generate a personalized display of content based on a user's intent. Referring now to FIG. 2, a block diagram is provided showing aspects of an example computing system architecture suitable for implementing various aspects of the present disclosure. The system 200 represents only one example of a suitable computing system architecture. Other arrangements and elements can be used in addition to or instead of the elements shown. As should be appreciated, elements described herein are functional entities that can be implemented as discrete or distributed components, or in conjunction with other components, and in any suitable combination or location.

As illustrated, the example system 200 includes a user data collector 202, a user interaction monitoring engine 204, a pattern understanding engine 206, a context threshold engine 220, at least one user data store 208, at least one blended content client 210, and, in some examples, a personalized display engine 218. In one example, functions performed by components of the example system 200 are associated with one or more applications 212, services 216, or a digital personal assistant 214. The components of the example system 200 can operate on one or more client computing devices 102, servers 106, can be distributed across one or more client computing devices 102 and servers 106, or can be implemented in the cloud. In some examples, one or more of the components of the example system 200 are distributed across network 110.

According to an aspect, the user data collector 202 is operative or configured to receive or collect user data from one or more data sources 104, and to store the received or collected user data in one or more data stores, such as user data store 208, where it can be available to other components of the system 200. In some examples, the user data are stored in or associated with a user profile. According to examples, the user data can include data received from a variety of data sources 104 where the data may be available in a variety of formats. According to one aspect, a data source 104 can include a cloud-based knowledge base. According to another aspect, a data source 104 can include a relational knowledge graph illustrative of a repository of entities and relationships between entities. In a knowledge graph, entities are represented as nodes, and attributes and relationships between entities are represented as edges connecting the nodes. Thus, a knowledge graph provides a structured schematic of entities and their relationships to other entities. According to examples, edges between nodes can represent an inferred relationship or an explicit relationship. According to an aspect, a knowledge graph can be continually updated with content mined from a plurality of other data sources 104 (e.g., web pages or other networked data stores). In some examples, the user data received by the user data collector 202 are collected by one or more sensors 108 integrated with or communicatively attached to one or more computing devices, such as one or more client computing devices 102, servers 106, or data sources 104. The one or more sensors 108 can be embodied as hardware, software, or a combination of hardware and software operative or configured to sense, detect, or otherwise obtain user data.

By way of example and not limitation, user data can include data that are sensed or determined from the one or more sensors 108, such as location information of a client computing device 102, properties or characteristics of the computing device(s) (such as device state, charging data, date/time, or other information derived from the computing device) and user interaction information (e.g., application usage; online activity; searches; voice data such as automatic speech recognition; activity logs; communications data including calls, texts, instant messages, and emails; website posts; and other user data associated with communication events). In some examples, user interaction information includes information associated with user interactions that occur over more than one computing device. User interaction information can further include user histories, session logs, application data, contacts data, calendar and schedule data, notification data, social-network data, news (including popular or trending items on search engines or social networks), online gaming data, ecommerce activities, user-account(s) data (which can include data from user preferences or settings associated with a personalization-related application 212, a digital personal assistant 214, or service 216), home-sensor data, appliance data, global positioning system (GPS) data, vehicle signal data, traffic data, weather data, wearable device data, other user device data (which may include device settings, profiles, network-related information (e.g., network name or ID, domain information, workgroup information, connection data, wireless network data, or configuration data, data regarding the model number, firmware, or equipment, device pairings, or other network-related information), gyroscope data, accelerometer data, payment or credit card usage data, purchase history data, or other sensor data that may be sensed or otherwise detected by a sensor 108 (or other detector) component(s). For example, other sensor data can include data derived from a sensor component associated with the user (including location, motion, orientation, position, user-access, user interactions, network-access, user device charging, or other data that is capable of being provided by one or more sensors), and other sources of data that can be sensed or determined as described herein.

With reference still to FIG. 2, the user interaction monitoring engine 204 is operative or configured to monitor received user data for information that can be used to determine user interaction information. In some examples, determining user interaction information includes identifying and tracking characteristics or other information associated with specific user interactions and related context information. In some examples, aspects of the user interaction monitoring engine 204 are operative or configured to determine user interactions associated with a particular user based on the monitored user data. For example, characteristics or information associated with specific user interactions can include home/personal related characteristics or work/productivity related characteristics. An example of a user interaction can include a user reading a document, and extracted user interaction related characteristics can include information such as an application 212 used to perform the interaction (e.g., access the document), document data, document metadata, the user's interactions with the document, as well as context information, such as the type of client computing device 102 being used to access the document, the user's location when accessing the document, information about the location (e.g., office location, home location, school, restaurant, gym, vacation spot, etc.), other entities associated with the interaction, temporal data (e.g., time of day, day of the week, month of the year, usage duration), other documents that the user interacts with, an emotional state of the user determined via an emotional system, the user's activity when accessing the document (e.g., traveling, walking, waiting, exercising), other applications 212 being used by the user concurrent to the user interaction, the user's activity preceding or following the user interaction, the weather, whether the user's client computing device 102 is paired with another device (e.g., a speaker, a display), etc.

The user interaction information determined by the user interaction monitoring engine 204 can include user interaction information from multiple computing devices associated with the user and/or from cloud-based services associated with the user (such as email, calendars, social media, or similar information sources), and which can include context information associated with the identified user interactions. In some examples, the user interaction monitoring engine 204 is operative or configured to determine current or near-real-time user interaction information. In other examples, the user interaction monitoring engine 204 is operative or configured to determine historical user interaction information, which can be determined based on gathering observations of user interactions over time, accessing user logs of past interactions (e.g., applications launched or accessed, files accessed, modified, copied, etc., websites navigated to, online content downloaded and rendered or played, or similar user interactions). In some examples, a series or sequence of user device interactions can be mapped to an interaction event, such that the interaction event is detected upon determining that the user data indicates the series or sequence of user interactions has been carried out by the user.

The extracted user interaction information can be provided to other components of the example system 200, such as the pattern understanding engine 206, the context threshold engine 220, the blended content client 210, or the personalized display engine 218. Further, the extracted user interaction information can be stored in a user profile associated with the user. With reference still to FIG. 2, the pattern understanding engine 206 is operative or configured to derive user interaction patterns based on user interaction information determined by the user interaction monitoring engine 204. In some examples, the pattern understanding engine 206 runs on a server 106, as a distributed application across multiple devices, or in the cloud. According to an aspect, one or more algorithms can be applied to the user interaction information to determine or understand a set of patterns that can be characterized as likely home/personal related or work/productivity related. For example, home/personal related or work/productivity related patterns can be determined based on similar instances of observation of user interactions or associated context information.

In some examples, the pattern understanding engine 206 is operative or configured to determine semantic information associated with user interaction related characteristics identified by the user interaction monitoring engine 204. For example, while a particular user interaction feature can indicate a specific document read by the user, a semantic analysis performed by the pattern understanding engine 206 can determine a category of the document, related documents, themes or topics or other entities associated with the document, or user interactions. In some examples, the pattern understanding engine 206 is operative or configured to determine additional user interaction related characteristics semantically related to the user interaction, which can be used for identifying user interaction patterns. According to an aspect, inferred interaction pattern information is provided to the context threshold engine 220. In some examples, a corresponding confidence score is calculated for the identified likely home/personal related or work/productivity related characteristics or patterns.

According to an aspect, the pattern understanding engine 206 can use semantic analysis to identify home/personal related or work/productivity related characteristics and determine other relevant features of interaction events to determine patterns. For example, in addition to determining, for a particular user, particular interactions (e.g., tasks that the user typically performs at certain times, particular websites that the user visits at certain times, particular communications the user has at certain times), semantic analysis can determine additional characteristics and features of the interactions, such as categories of the tasks (e.g., family-related task, scheduling-related task, hobby-related task, work project-related task), categories of the websites (e.g., sports-related website, news-related website, celebrity gossip-related website, politics-related website), and communications. Further, using semantic analysis, the pattern understanding engine 206 is operative or configured to categorize the context of particular interactions as home/personal related or work/productivity related.

In some examples, context of a particular interaction can be categorized as home/personal related based on various characteristics of the interaction although the home/personal related interaction is being performed during working hours at a location that is known as work-related (e.g., at the user's office). For example, a pattern of visiting shopping-related websites at work over lunch can be determined where a user routinely visits shopping-related websites at work over lunch. Likewise, the context of a particular interaction can be categorized as work/productivity related based on various characteristics of the interaction although the work/productivity related interaction is being performed at a time outside of working hours at the user's home. For example, a pattern of scheduling work-related meetings from home late at night can be determined where the user routinely schedules work-related meetings from home.

With reference still to FIG. 2 and according to an aspect, the context threshold engine 220 is operative or configured to determine an efficient blend of home/personal and work/productivity related content or information based on the user's intent and an appropriate context inferred from the user interaction patterns and historic home/personal related or work/productivity related characteristics, and current home/personal related or work/productivity related characteristics. In some examples, the context threshold engine 220 determines a ratio of home/personal information to work/productivity related information to surface to a particular user with respect to the user's current context and based on learned patterns and characteristics of the user's past interactions. According to an aspect, a user can interact with a client computing device 102. In response to receiving an indication of the user interaction, the pattern understanding engine 206 can use semantic analysis to identify home/personal related or work/productivity related characteristics and determine semantic information related to the user interaction for inferring interactions that the user is likely to perform or information that is likely to be relevant to the user based on historical user interactions that are similar to the current interaction. According to an aspect, the inferred interactions can include home/personal interactions and work/productivity interactions.

According to an aspect, the context threshold engine 220 determines a home/personal-work/productivity context threshold based on the inferred user intent and context information associated with user's current context. For example, based on various characteristics associated with the current user interaction and on a pattern determined to be the most similar to the current interaction by the pattern understanding engine 206, the context threshold engine 220 determines a home/personal-work/productivity context threshold. In one example, the home/personal-work/productivity context threshold is used to calculate edge weights (in the knowledge graph) representing relationships between the user and entities associated with the inferred interactions that the user is likely to perform or information likely to be relevant to the user in the current context. According to an example, two particular nodes can have a strong edge weight between them at one particular home/personal-work/productivity context threshold value, thus indicating an interactivity, content type, or other information item with a high degree of relevance to the user in a particular context. Alternatively, in a different context, the two particular nodes can have a lesser edge weight between them based on the calculated home/personal-work/productivity context threshold value, thus indicating an interactivity, content type, or other information item with a low degree of relevance to the user in the particular context.

Consider, for example, that a user is at home on a weekday night (e.g., as identified by the user interaction monitoring engine 204) and that the user typically works from home for a couple of hours on weekday nights (e.g., based on a pattern understood by the pattern understanding engine 206). Additional context information can be collected (e.g., via various sensors 108) and analyzed that indicates that the user is currently in an emotional state of distress and that the user is likely experiencing a stressful life event based on information collected from various data sources 104, such as the user's calendar entries, communications, and recent browsing history. Accordingly, based on current home/personal related or work/productivity related characteristics and the users' current state as inferred according to user interaction data, user data, and context information, such as context information collected from one or more sensors 108, the context threshold engine 220 can determine current likely priorities of the user, identify whether those priorities are home/personal related or work/productivity related, and to determine an efficient blend or ratio of home/personal related and work/productivity related information to surface to the user. In various examples, home/personal related and work/productivity related information can include documents, web content, specific application-related content (e.g., calendar information, electronic messages), contact information, etc. In some examples, the home/personal and work/productivity related information includes a blended workflow comprised of home/personal related and work/productivity related tasks.

According to an aspect, the context threshold engine 220 provides the determined home/personal-work/productivity context threshold to a blended content client 210, such as an application 212, a digital personal assistant 214, or a services 216 operative or configured to provide personalized content to the user based on the user's explicitly defined or inferred intent. In some examples, one or more components of the system 200 (e.g., the user data collector 202, the user interaction monitoring engine 204, the pattern understanding engine 206, the context threshold engine 220, the user data store 208, or the personalized display engine 218) are exposed to one or more applications 212, digital personal assistants 214, or services 216 as an API (Application Programming Interface).

A user can use an application 212 on a client computing device 102 for a variety of tasks, which can include, for example, to write, calculate, draw, take and organize notes, organize and prepare presentations, search for and obtain information, send and receive electronic mail, make music, and the like. Examples of suitable applications 212 include, but are not limited to, word processing applications, spreadsheet applications, slide presentation applications, electronic mail applications, drawing applications, note-taking applications, web browser applications, game applications, and mobile applications. Applications 212 can include thick client applications, which are stored locally on the client computing device 102, or may include thin client applications (i.e., web applications) that reside on a remote server 106 and accessible over a network 110 or a combination of networks. A thin client application can be hosted in a browser-controlled environment or coded in a browser-supported language and can rely on a common web browser to render the application executable on the client computing device 102. According to examples, the application 212 is a program that is launched and manipulated by an operating system, and manages content, which can be displayed on a display screen. In some examples, an application 212 is operative or configured to generate and provide a graphical user interface (GUI) that allows a user to interact with application functionality and electronic content.

Digital personal assistant functionality can be provided as or by a stand-alone digital personal assistant application, part of an application 212, or part of an operating system of the client computing device 102. In some examples, the digital personal assistant 214 employs a natural language user interface (UI) that can receive spoken utterances from a user that are processed with voice or speech recognition technology. For example, the natural language UI can include an internal or external microphone, camera, and various other types of sensors 108. The digital personal assistant 214 can support various functions, which can include interacting with the user (e.g., through the natural language UI or GUIs); performing tasks (e.g., making note of appointments in the user's calendar, sending messages and emails, etc.); providing services (e.g., answering questions from the user, mapping directions to a destination, other application 212 or service 216 functionalities that supported by the digital personal assistant 214, etc.); gathering information (e.g., finding information requested by the user about a book or movie, locating the nearest Italian restaurant, etc.); operating the client computing device 102 (e.g., setting preferences, adjusting screen brightness, turning wireless connections on and off); and various other functions. The functions listed above are not intended to be exhaustive and other functions may be provided by the digital personal assistant 214. In examples, the applications 212 or digital personal assistant 214 receive input from the user via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence.

In some examples, the blended content client 210 includes web search functionality, for example, to locate, retrieve and display content available on the World Wide Web, including, for example, Web pages, images, videos, and the like. The user can use the blended content client 210 to surface information based on a user query. For example, the user query is an example of a current user interaction. Based on the user interaction, context information, learned user interaction patterns, and historical home/personal and work/productivity related characteristics and patterns, the user intent and current likely priorities of the user are inferred for determining an efficient blend or ratio of home/personal related and work/productivity related information to surface to the user. According to an aspect, based on the blend of home/personal related and work/productivity related information determined based on a calculated home/personal-work/productivity context threshold value, results for the user query are ranked. For example, the current user interaction can be inferred to be home/personal related, and accordingly, query results that are categorized as home/personal related can be ranked higher and surfaced to the user with higher priority than results that are categorized as work/productivity related. In some examples, the amounts of home/personal related information and work/productivity related information surfaced to the user are determined from a ratio based on the home/personal-work/productivity context threshold. For example, based on various pieces of context information, a determination can be made that a user is on vacation. Accordingly, a web search initiated by the user while on vacation, can surface results that are less-work/productivity related and more home/personal related. For example, results for a "screwdriver varieties" web query while on vacation can surface more drink-related results, while results for a "screwdriver varieties" web query while in a work context can surface more tool-related results.

According to an aspect, a personalized display engine 218 is integrated with or communicatively attached to a blended content client 210. In some examples, the personalized display engine 218 is operative or configured to selectively allocate screen resources for the blend of home/personal and work/productivity related information based on a determined priority or relevance of an information item to the user's current context, wherein the relevance is calculated based on the determined home/personal-work/productivity context threshold value. For example, a GUI generated for an application 212, digital personal assistant 214, or service 216 can be arranged such that information that is determined to be more relevant to the user is positioned in the GUI at a place of prominence, that is, in a place that is easily seen and is easily accessible to the user. In some examples, the size of the display of priority information is larger than the size of the display of less relevant information. Various examples will be described below with reference to FIG. 3.

Figure 3:
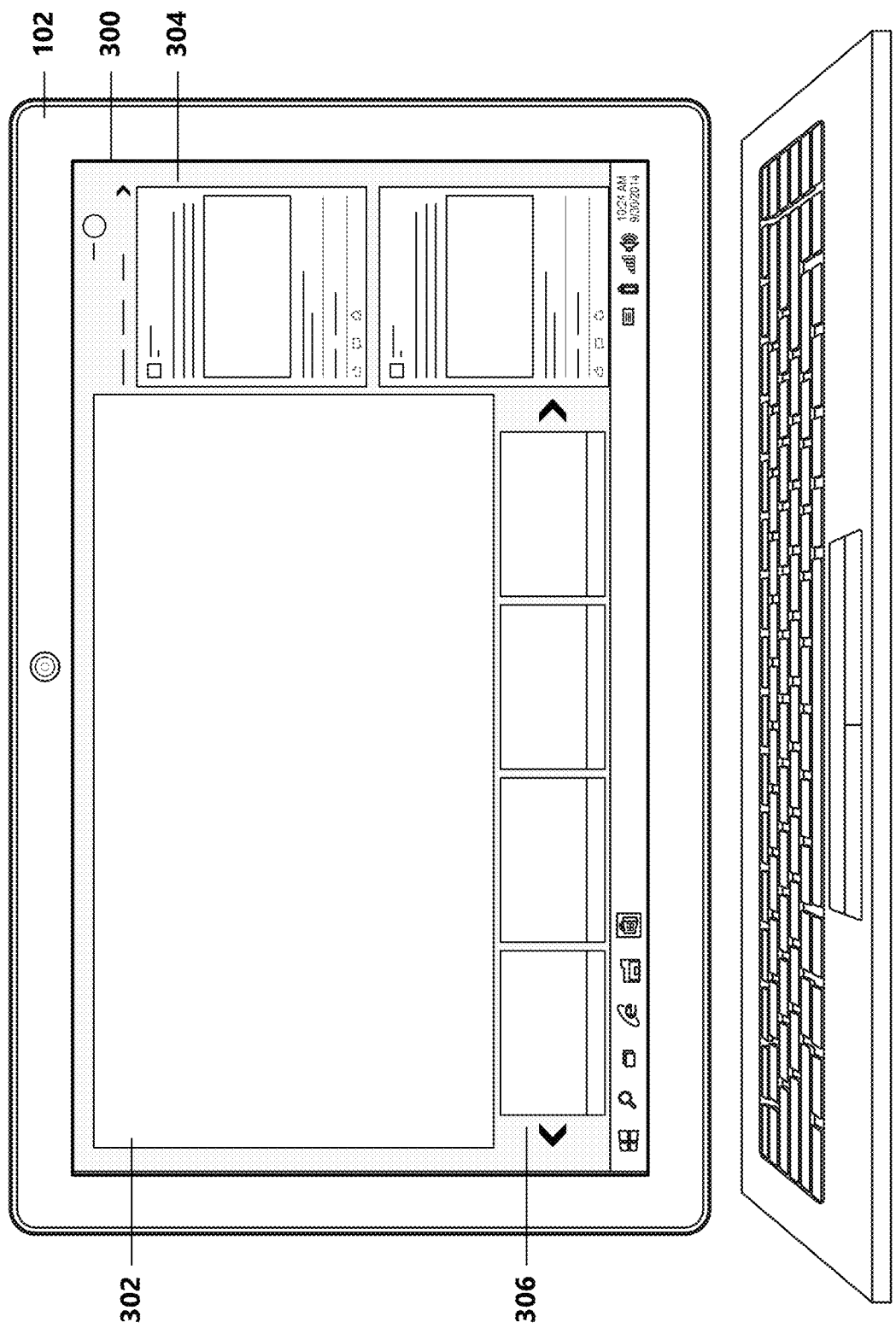
FIG. 3 is an illustration of an example user interface display showing an example user interface arranged wherein the arrangement of information in the user interface is personalized to a particular user.

With reference now to FIG. 3, an example GUI 300 display is shown, wherein the arrangement of information in the GUI 300 is personalized to a particular user as determined by the personalized display engine 218. In a first example, consider a user whose current context indicates a scenario where the user is at work. According to user data, the system knows who the user is, the user's profession, what the user is working on, the user's professional, social, and personal networks, etc. Additional user data and context information indicates that the user is a parent of a fifteen year old girl whose birthday is in a couple of weeks. Additional user data and context information can indicate that the user is planning to take the user's daughter to take a drivers test on the daughter's birthday and, based on characteristics of a batch of recent online searches about how to prepare for a drivers test, a user priority corresponding to helping to prepare the daughter for her drivers test can be inferred. As can be appreciated, the user priority can be categorized as home/personal related, and can continue as a user priority even during working hours at a location corresponding to the user's office (i.e., work/productivity related location).

According to the first example, an indication of a user interaction can be received by the system 200, such as an interaction associated with opening an application 212 or service 216, or with using the digital personal assistant 214 that is operative or configured to provide a blended work/life user experience. According to an example, the application 212, digital personal assistant 214, or service 216 is operative or configured to display a GUI 300 including information that is currently relevant to the user. For example, based on the user's previous user interactions and patterns and characteristics learned from the user's previous interactions and based on current context information, a home/personal-work/productivity context threshold is calculated for determining user interactions, content items, categories of information, events, or other information items that are likely to have a high degree of relevance to the user in the particular current context. According to an aspect, the information that is relevant to the user in the current context includes a blend of home/personal and work/productivity related information, and the personalized display engine 218 is operative or configured to arrange the information for display to the user in the example GUI 300 based on a determined relevance to the user.

According to the example, the GUI 300 can include a variety of work/productivity related information, such as general company information, newsfeeds that the user typically reads that are specific to the user's profession and industry, trending searches relating to current popular searches that can be relative and specific to the user, recent documents, information relating to projects that the user is working on, the user's schedule, unread work/productivity related messages, task items, and other work/productivity related information items that are currently relevant to the user. The GUI 300 can further include a variety of currently relevant home/personal related information, such as information relating to helping to prepare the user's daughter for her drivers test, newsfeeds that the user typically reads that are specific to the user's hobbies or personal interests, unread home/personal related messages, home/personal related task items, and other home/personal related information that is currently relevant to the user.

According to an aspect, based on a determined degree of relevance to the user, the personalized display engine 218 allocates particular screen resources to the work/productivity related information and home/personal related information. For example, higher priority items that are determined to be more relevant to the user can be assigned to prime positions 302, 304, 306 in the GUI 300, wherein a prime position can be related to a position on the screen that is determined to be a prominent focal point. For example, a highest ranked work/productivity related information item or home/personal related information item can be displayed in a first prime position 302 associated with a primary position in the GUI 300. In some examples, a size of the display of a work/productivity related information or home/personal related information is associated with the determined relevance or priority to the user. For example and as illustrated in FIG. 3, a work/productivity related information or home/personal related information displayed in the first prime position 302 is displayed larger than other information displayed in the GUI 300.

According to one example, the first prime position 302 is designated to include a work/productivity related and home/personal related blend of navigational scopes, intelligent task completion items, and quick links and actions. According to another example, a second prime position 304 is designed to include a blend of company feeds, professional feeds, industry feeds, and personal-related feeds. According to another example, a third prime position 306 is designed to include a blend of trending company searches and quick links, trending personal-related searches and quick links, project information, most recent documents, general company information, and the like.

According to an aspect, when characteristics of the user's current context change, the arrangement of information in the GUI 300 is personalized to the user as determined by the personalized display engine 218. In a second example, consider that the user's current context indicates a scenario where the user is on vacation. Based on the user's previous user interactions and patterns and characteristics learned from the user's previous interactions and based on current context information, a home/personal-work/productivity context threshold is calculated for determining user interactions, content items, categories of information, events, or other information items that are likely to have a high degree of relevance to the user in the particular current context. For example, based on the current context, items that are likely to be relevant to the user can include a higher threshold of home/personal information, and/or home/personal information can be arranged in prime positions 302, 304, 306 in the GUI 300.

Figure 4A:
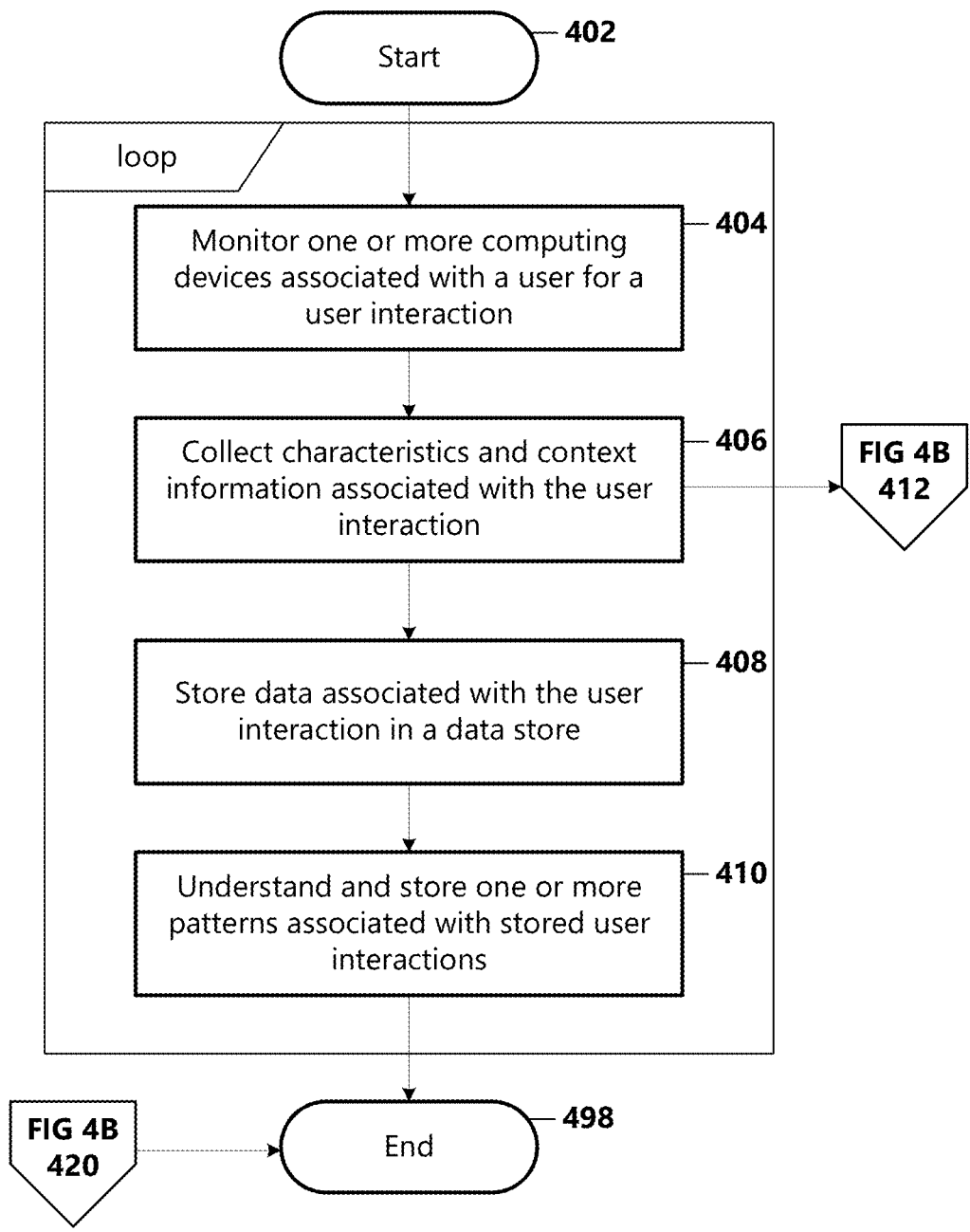
FIGS. 4A-B are a flow chart showing general stages involved in an example method for generating a user experience that provides a blended workflow of relevant information to the user based on the user's current work and life characteristics.
Figure 4B:
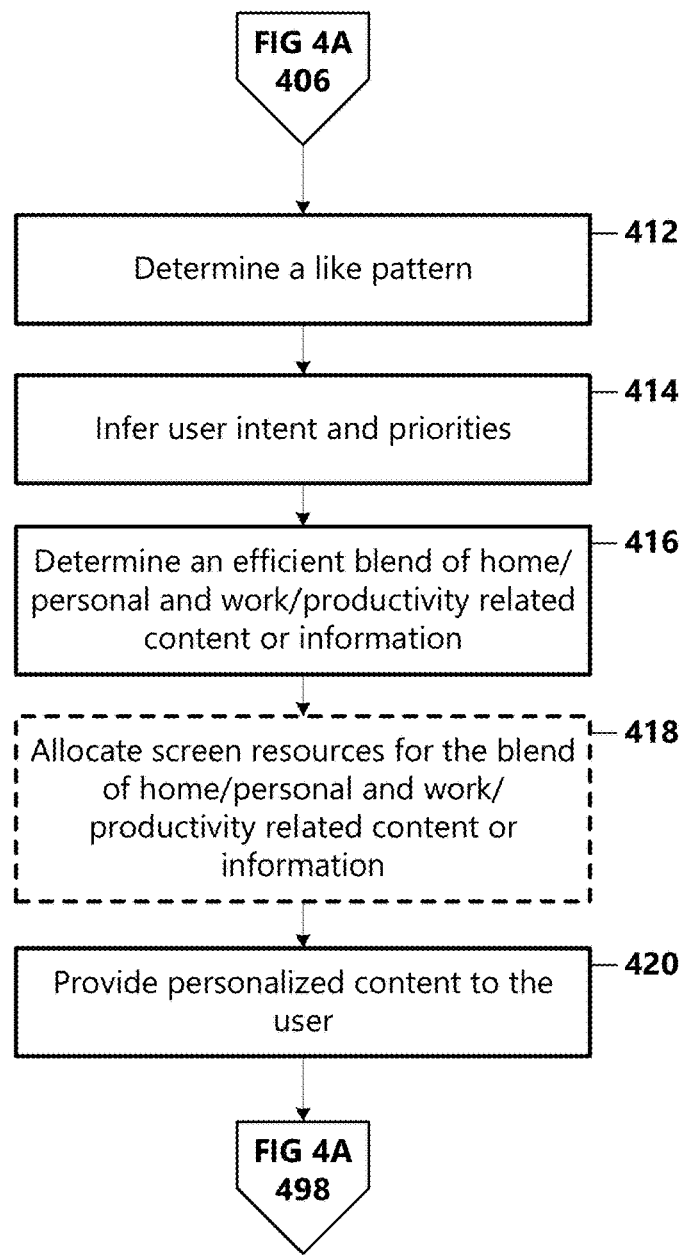

Having described an operating environment 100, an example system 200, and user interface display examples with respect to FIGS. 1-3, FIGS. 4A-B are a flow chart showing general stages involved in an example method 400 for generating a user experience that provides a blended workflow of relevant information to the user based on the user's current work and life characteristics. According to examples, OPERATIONS 404-410 can iterate in a continual loop for learning and understanding user interaction patterns and home/personal related and work/productivity related characteristics, and OPERATIONS 404-406 and 412-420 illustrate providing the user with a blend of home/personal related and work/productivity related information based on the user's intent. With reference now to FIG. 4A, the method 400 begins at start OPERATION 402, and proceeds to OPERATION 404, where the user interaction monitoring engine 204 monitors one or more client computing devices 102 associated with a user for a user interaction, such as a search query, launching or accessing an application 212, accessing, modifying, or copying a file, etc., navigating to a website, downloading, rendering, or playing online content, or other user interaction. In some examples, a series or sequence of user device interactions can be mapped to an interaction event, such that the interaction event is detected upon determining that the user data indicate the series or sequence of user interactions has been carried out by the user.

The method 400 proceeds to OPERATION 406, where user data and characteristics and context information associated with the user interaction are collected. For example, the data can be collected from one or more data sources 104, from one or more sensors 108 integrated with or communicatively attached to one or more computing devices. Examples of user data and sensor data are described above with respect to FIG. 2. At OPERATION 408, the collected or extracted user interaction information can be stored in a user profile associated with the user.

The method 400 proceeds from OPERATION 408 to OPERATION 410, where the pattern understanding engine 206 derives user interaction patterns based on user interaction information determined by the user interaction monitoring engine 204. According to an aspect, one or more algorithms can be applied to the user interaction information to determine or understand a set of patterns that can be characterized as home/personal related or work/productivity related. For example, home/personal related or work/productivity related patterns can be determined based on similar instances of observation of user interactions or associated context information. The method 400 can end by proceeding to OPERATION 498, or continue in providing the user with a blend of home/personal related and work/productivity related information based on the user's intent by proceeding from OPERATION 406 to OPERATION 412 in FIG. 4B.

At OPERATION 412, the pattern understanding engine 206 can use semantic analysis to identify home/personal related or work/productivity related characteristics and determine semantic information related to the user interaction, and compare characteristics of the current user interaction against historical user interactions. At OPERATION 414, the pattern understanding engine 206 infers home/personal interactions and work/productivity interactions that the user is likely to perform or information that is likely to be relevant to the user based on historical user interactions that are similar to the current interaction and based on the current context.

The method 400 proceeds to OPERATION 416, where, based on various characteristics associated with the current user interaction and on a pattern determined to be the most similar to the current interaction by the pattern understanding engine 206, the context threshold engine 220 determines a home/personal-work/productivity context threshold for calculating edge weights (in the knowledge graph) representing relationships between the user and entities associated with the inferred interactions that the user is likely to perform or information likely to be relevant to the user in the current context. For example, two particular nodes with a strong edge weight between them indicate an interactivity or information with a high degree of relevance to the user in the current context.

The method 400 proceeds to OPTIONAL OPERATION 418, where the personalized display engine 218 allocates screen resources for a blend of home/personal and work/productivity related information based on a determined priority or relevance of an information item to the user's current context, wherein the relevance is calculated based on the determined home/personal-work/productivity context threshold. At OPERATION 420, a GUI 300 is generated, and personalized content is provided to the user in the GUI based on the user's intent. The method 400 ends at END OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
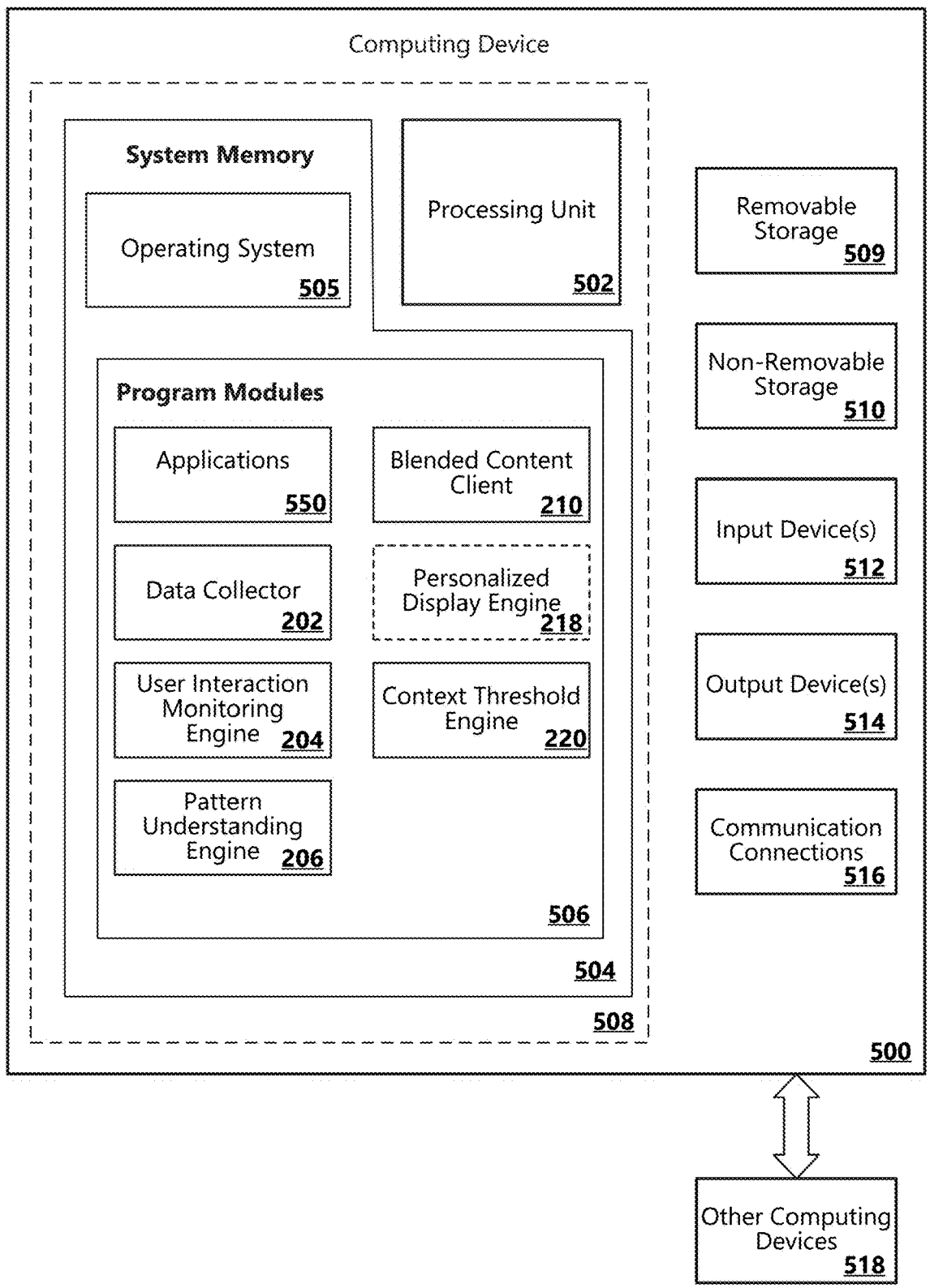
FIG. 5 is a block diagram illustrating example physical components of a computing device.
Figure 6A:
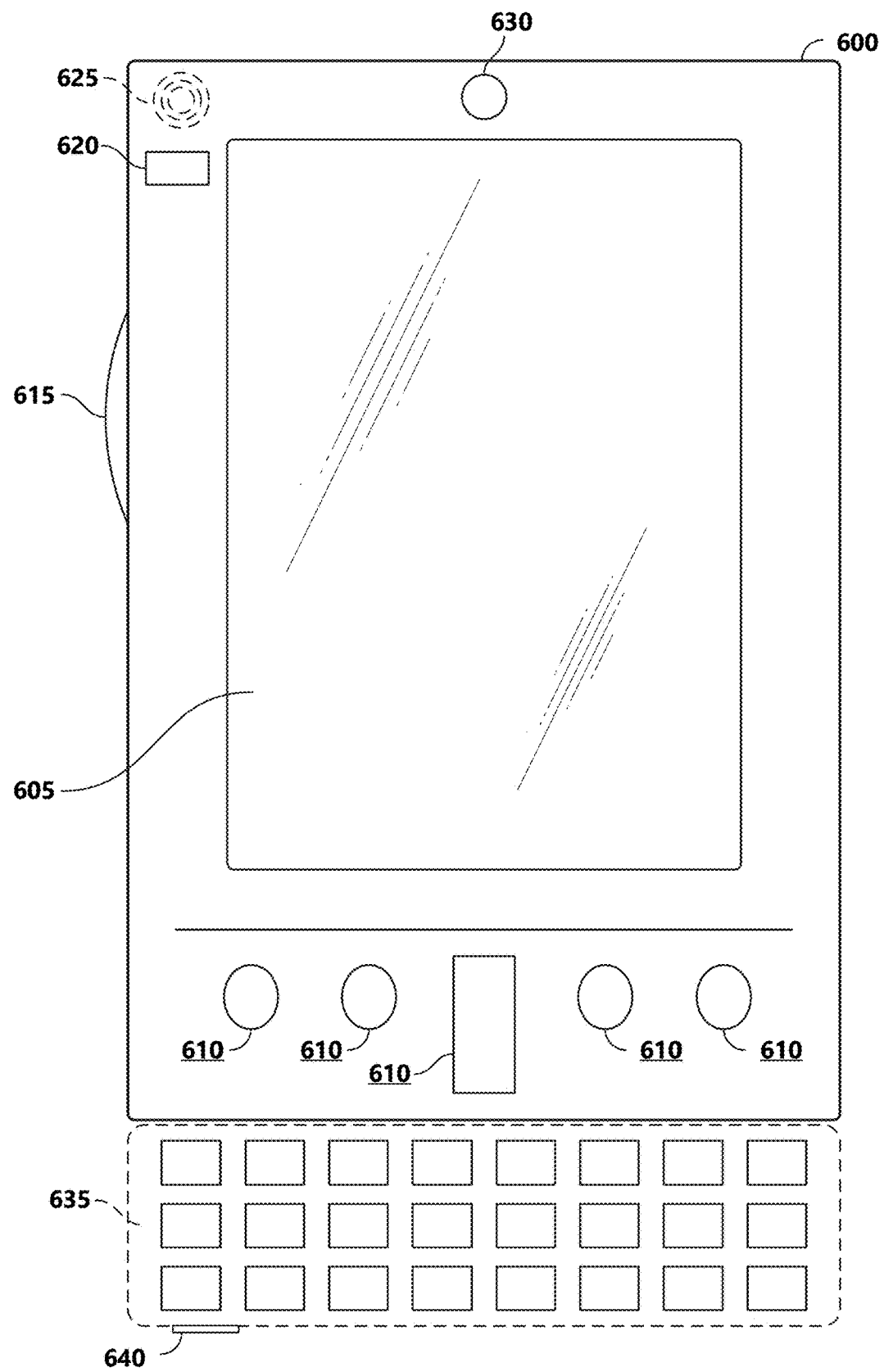
FIGS. 6A and 6B are simplified block diagrams of a mobile computing device.
Figure 6B:
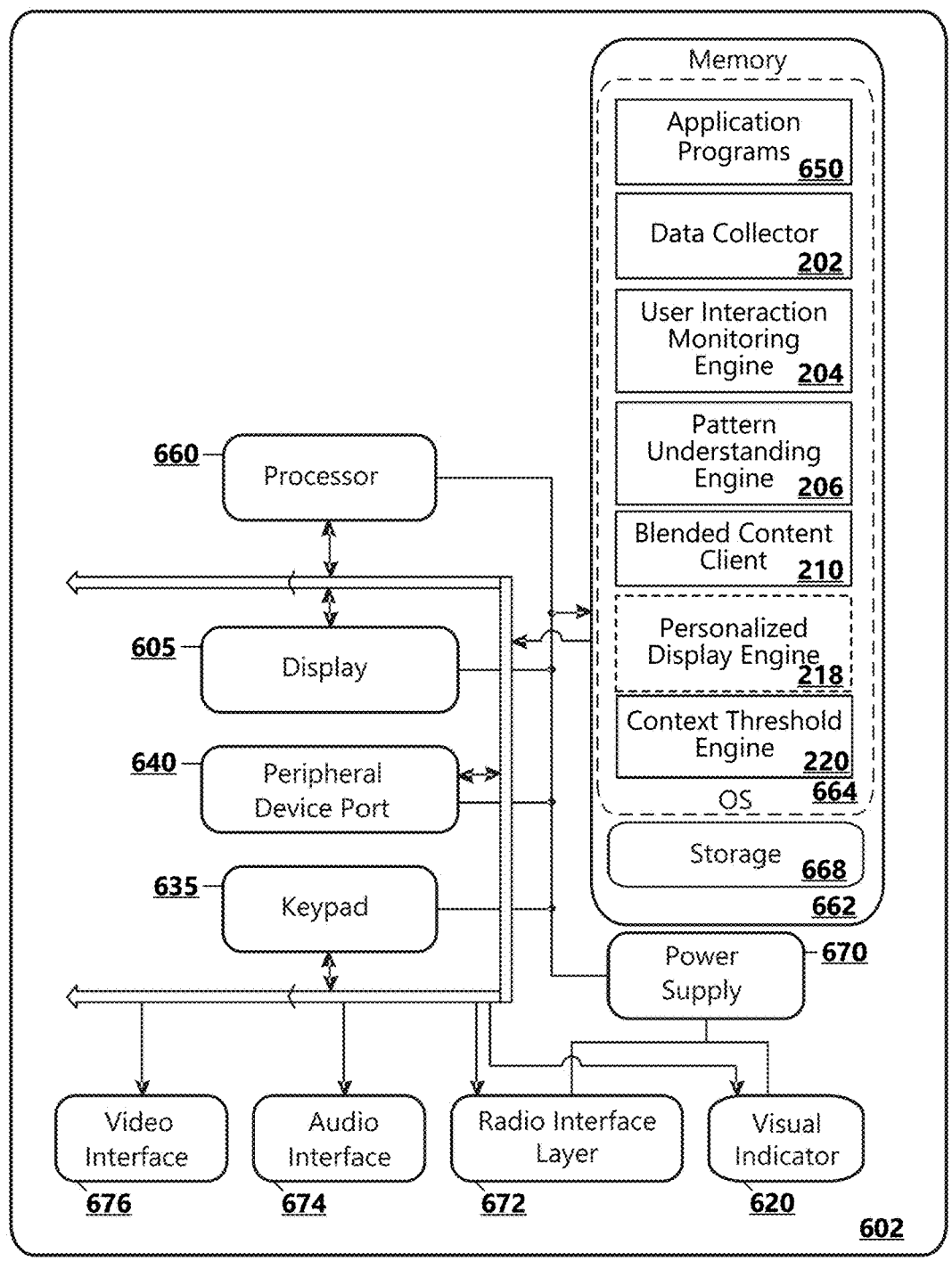
Figure 7:
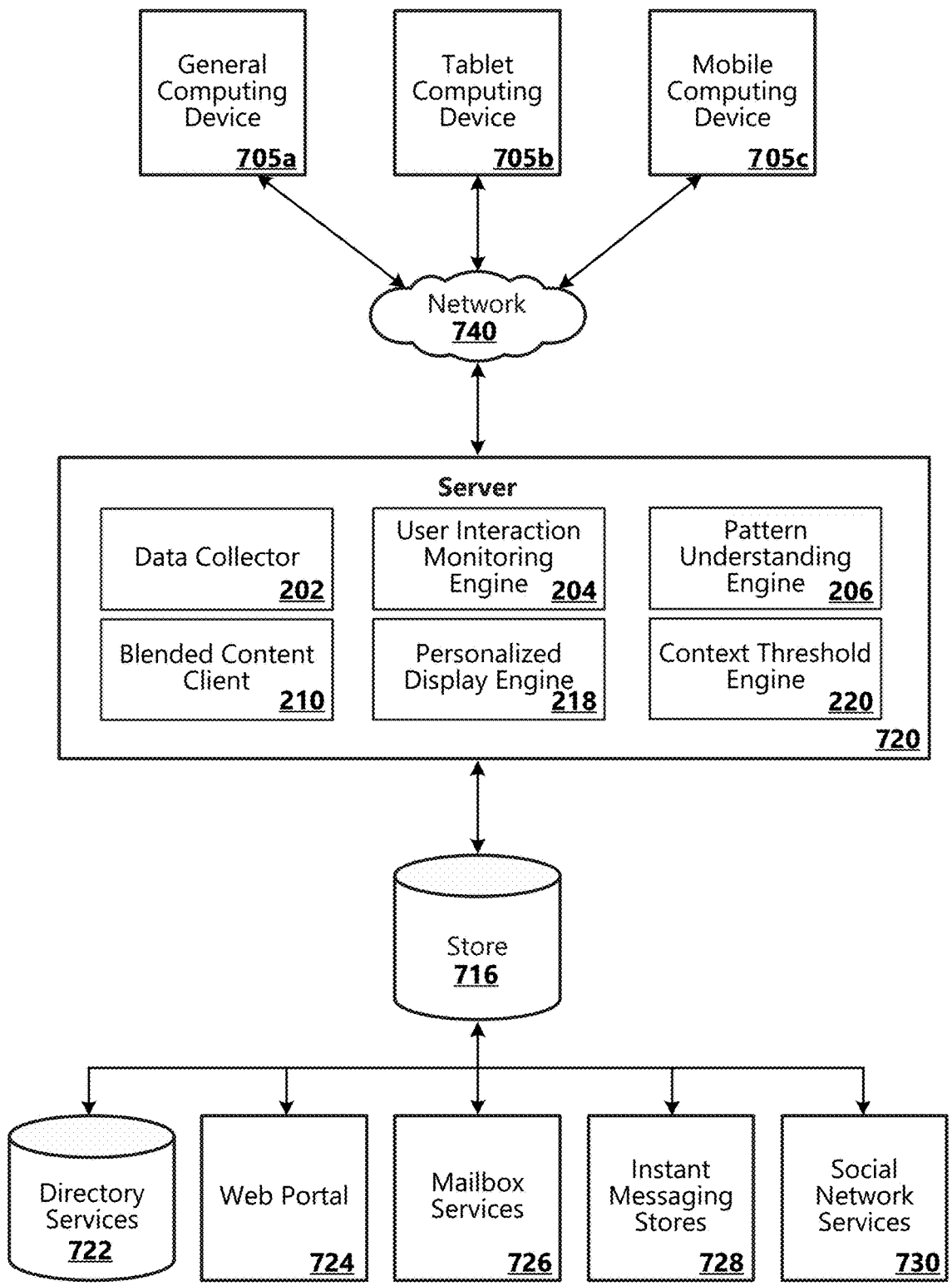
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the one or more components of the example system 200 (e.g., user data collector 202, user interaction monitoring engine 204, pattern understanding engine 206, context threshold engine 220, blended content client 210, and personalized display engine 218). The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., one or more components of the example system 200 (e.g., user data collector 202, user interaction monitoring engine 204, pattern understanding engine 206, context threshold engine 220, blended content client 210, and personalized display engine 218) perform processes including, but not limited to, one or more of the stages of the method 400 illustrated in FIGS. 4A and 4B. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery medium. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, one or more components of the example system 200 (e.g., user data collector 202, user interaction monitoring engine 204, pattern understanding engine 206, context threshold engine 220, blended content client 210, and personalized display engine 218) are loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing an efficient blend of home/personal and work/productivity related content based on a user's intent as described above. Content developed, interacted with, or edited in association with the one or more components of the example system 200 (e.g., user data collector 202, user interaction monitoring engine 204, pattern understanding engine 206, context threshold engine 220, blended content client 210, and personalized display engine 218) is enabled to be stored in different communication channels or other storage types. For example, various documents may be stored using a directory service 722, a web portal 724, a mailbox service 726, an instant messaging store 728, or a social networking site 730. One or more components of the example system 200 (e.g., user data collector 202, user interaction monitoring engine 204, pattern understanding engine 206, context threshold engine 220, blended content client 210, and personalized display engine 218) are operative or configured to use any of these types of systems or the like for providing an efficient blend of home/personal and work/productivity related content based on a user's intent, as described herein. According to an aspect, a server 720 provides the one or more components of the example system 200 (e.g., user data collector 202, user interaction monitoring engine 204, pattern understanding engine 206, context threshold engine 220, blended content client 210, and personalized display engine 218) to clients 705a,b,c. As one example, the server 720 is a web server providing one or more components of the example system 200 over the web. The server 720 provides one or more components of the example system 200 over the web to clients 705 through a network 740. By way of example, the client computing device is implemented and embodied in a personal computer 705a, a tablet computing device 705b or a mobile computing device 705c (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for providing a personalized blend of relevant content to a user based on an inferred context, the system comprising:
   at least one processing device; and
   at least one computer readable data storage device storing instructions that, when executed by the at least one processing device, cause the system to:
      receive an indication of a current user interaction on a computing device;
      determine one or more characteristics of the current user interaction, the one or more characteristics associated with one or both of a first context type and a second context type;
      determine a historic user interaction pattern having characteristics similar to the one or more characteristics of the current user interaction, the historic user interaction pattern categorized as one of the first context type or the second context type;
      determine whether the current user interaction is one of the first context type or the second context type based on the determined one or more characteristics and the determined historic user interaction pattern;
      based on the determined context type, determine a ratio of information related to the first context type to information related to the second context type; and
      in response to the indication of a current user interaction, display an arrangement of the information relating to the first context type and the information relating to the second context type, according to the ratio, within a user interface on the computing device.

2. The system of claim 1, wherein the current user interaction comprises:
   launching or accessing an application or service operative to provide personalized content to the user; or
   a search query.

3. The system of claim 1, wherein prior to receiving the indication of the current user interaction, the system is operative to:
   receive indications of user interactions;
   collect user data and interaction information associated with the user interactions; and
   determine and store a plurality of user interaction patterns based on the user data and user interaction information.

4. The system of claim 3, wherein in determining the plurality of user interaction patterns, the system is operative to categorize characteristics of each of the plurality of user interaction patterns as one of the first context type or the second context type.

5. The system of claim 3, wherein the user data and the user interaction information comprise data sensed or determined from one or more sensors integrated in or communicatively attached to the computing device.

6. The system of claim 5, wherein the system is further operative to collect the user data and the user interaction information associated with the current user interaction.

7. The system of claim 6, wherein in determining the context type for the current user interaction, the system is operative to:
   infer interactions that the user is likely to perform or information that is likely to be relevant to the user in a current context of the current user interaction based on the determined one or more characteristics and the determined historic user interaction pattern.

8. The system of claim 7, wherein the system is further operative to rank the inferred interactions and information based on context information associated with the current user interaction, wherein a higher edge weight indicates a higher degree of relevance to the user.

9. The system of claim 8, wherein screen positions at which inferred interactions and information are displayed are allocated based on a degree of relevance to the user.

10. The system of claim 1, wherein the first context type is a home/personal context type and the second context type is a work/productivity context type.

11. A computer-implemented method for providing a personalized blend of relevant content to a user based on an inferred context, comprising:
   receiving an indication of a current user interaction on a computing device;
   determining one or more characteristics of the current user interaction, the one or more characteristics associated with one or both of a first context type and a second context type;
   determining a historic user interaction pattern having characteristics similar to the one or more characteristics of the current user interaction, the historic user interaction pattern categorized as one of the first context type or the second context type;
   determining a context type for the current user interaction as one of the first context type or the second context type based on the determined one or more characteristics and the determined historic user interaction pattern;
   based on the determined context type, determining a ratio of information related to the first context type to information related to the second context type; and
   display an arrangement of the information relating to the first context type and the information relating to the second context type, according to the ratio, within a user interface on the computing device.

12. The method of claim 11, wherein the first context type is a home/personal context type and the second context type is a work/productivity context type.

13. The method of claim 11, wherein receiving the indication of the current user interaction comprises receiving the indication of one of:
   launching or accessing an application, service, or a digital personal assistant operative to provide personalized content to the user; or
   a search query.

14. The method of claim 11, wherein prior to determining the context type for the current user interaction:

collecting user data and interaction information associated with the current user interaction and with past user interactions; and determining a plurality of user interaction patterns based on user data and user interaction information.

15. The method of claim 14, wherein determining the plurality of user interaction patterns comprises categorizing characteristics of each of the plurality of user interaction patterns as one of the first context type or the second context type.

16. The method of claim 11, wherein determining the context type for the current user interaction comprises:

inferring interactions that the user is likely to perform or information that is likely to be relevant to the user in a current context of the current user interaction based on the determined one or more characteristics and the determined historic user interaction pattern.

17. The method of claim 16, further comprising:

using the determined context type to calculate weights of edges in a knowledge graph representing relationships between the user and entities associated with the inferred interactions that the user is likely to perform or information likely to be relevant to the user in the current context; and ranking the inferred interactions and information based on calculated edge weights, wherein a higher edge weight indicates a higher degree of relevance to the user.

18. The method of claim 17, wherein the arrangement of the information related to the first context type and the information related to the second context type comprises allocating screen positions at which the inferred interactions and information are displayed based on a degree of relevance to the user.

19. The method of claim 18, wherein allocating screen resources comprises assigning prime screen positions to information that is determined to be more relevant to the user.

20. A computer readable storage device including computer readable instructions, which when executed by a processing unit is operative to:

collect user data and interaction information associated with user interactions;

determine and store a plurality of user interaction patterns based on the user data and user interaction information;

receive an indication of a current user interaction on a computing device related to a user;

determine one or more characteristics of the current user interaction;

determine a historic user interaction pattern from the plurality of user interaction patterns stored having characteristics similar to the one or more characteristics of the current user interaction;

determine a context for the current user interaction based on the determined one or more characteristics and the determined historic user interaction pattern;

based on a type of the determined context, determine a ratio of information related to the type of the determined context to other non-related information; and in response to the user data and the interaction information associated with the user interactions, display an arrangement of the information relating to the first context type and the non-related information, according to the ratio, within a user interface on the computing device.

* * * * *